United States Patent
Park

(10) Patent No.: US 7,607,800 B2
(45) Date of Patent: Oct. 27, 2009

(54) BACKLIGHT UNIT AND LIQUID CRYSTAL DISPLAY WITH THE SAME

(75) Inventor: Hee Jeong Park, Bucheon-si (KR)

(73) Assignee: LG Display Co., Ltd., Seoul (KR)

( * ) Notice: Subject to any disclaimer, the term of this patent is extended or adjusted under 35 U.S.C. 154(b) by 324 days.

(21) Appl. No.: 11/258,954

(22) Filed: Oct. 27, 2005

(65) Prior Publication Data
US 2006/0092348 A1    May 4, 2006

(30) Foreign Application Priority Data
Oct. 30, 2004    (KR) ...................... 10-2004-0087582

(51) Int. Cl.
*F21V 1/00*    (2006.01)

(52) U.S. Cl. .......... 362/240; 362/561; 362/607; 362/330; 362/612; 362/800; 362/241; 362/247

(58) Field of Classification Search .......... 362/240, 362/612, 800, 561, 607, 330, 241, 243
See application file for complete search history.

(56) References Cited

U.S. PATENT DOCUMENTS

| | | | |
|---|---|---|---|
| 6,974,229 B2 * | 12/2005 | West et al. | 362/227 |
| 6,991,347 B2 * | 1/2006 | Voser | 362/231 |
| 7,108,385 B2 * | 9/2006 | Huang et al. | 362/631 |
| 2004/0109629 A1 * | 6/2004 | Kondo | 385/14 |
| 2004/0228107 A1 * | 11/2004 | Lee et al. | 362/31 |
| 2005/0063657 A1 * | 3/2005 | Huang et al. | 385/129 |
| 2005/0259424 A1 * | 11/2005 | Zampini et al. | 362/294 |
| 2007/0070625 A1 * | 3/2007 | Bang | 362/240 |
| 2007/0297163 A1 * | 12/2007 | Kim et al. | 362/29 |

* cited by examiner

*Primary Examiner*—Sandra L O'Shea
*Assistant Examiner*—Jessica L McMillan
(74) *Attorney, Agent, or Firm*—Birch, Stewart, Kolasch & Birch, LLP

(57) ABSTRACT

A backlight unit and a liquid crystal display device including such a backlight unit are provided. According to an embodiment, there is provided a backlight unit comprising a plurality of light emitting diodes (LEDs) for generating light, a printed circuit board (PCB) for controlling the LEDs, a transparent scattering plate provided with a scattering optical pattern for scattering the light from the LEDs, and a diffusing plate for diffusing the light scattered by the scattering plate.

6 Claims, 2 Drawing Sheets

BACKLIGHT UNIT AND LIQUID CRYSTAL DISPLAY WITH THE SAME

This application claims priority under 35 U.S.C. §119 on Patent Application No. 10-2004-0087582 filed on Oct. 30, 2004 in the Republic of Korea, the entire contents of which are hereby incorporated by reference.

BACKGROUND OF THE INVENTION

1. Field of the Invention

The present invention relates to a backlight unit that can reduce light losses that may be caused by leakage of the light to an external side. The present invention further relates to a liquid crystal display (LCD) with such a backlight unit.

2. Description of the Related Art

In recent years, an LCD has increasingly gained attention as a flat display device that varies optical anisotropy by applying an electric field to liquid crystal having a fluidity property as well as a crystal optical property. Since the LCD is relatively slim, with low electric consumption and capability of being made in a large-sized display panel with a high definition, it has been widely used.

Generally, such an LCD has a liquid crystal panel that displays a desired image on a screen by adjusting an amount of light fed from a backlight unit. The liquid crystal panel includes a plurality of liquid crystal cells arranged in a matrix pattern and a plurality of control switches for converting video signals that are to be fed to the liquid crystal cells.

In order to reduce a thickness of the LCD, the backlight unit used for the LCD has been made slimmer and light-weight. To accomplish this, a light emitting diode (LED) instead of CCFL has been used for the backlight unit since the light emitting diode is favorable in an electric power consumption, weight and brightness.

FIG. 1 is a sectional view of a related art liquid crystal display with an LED backlight unit and FIG. 2 is a view illustrating a light emission from a related art side emitter type LED.

As shown in FIG. 1, a related art liquid crystal display 1 includes a liquid crystal panel 19 having upper and lower substrates between which liquid crystal disposed and a backlight unit feeding light to the liquid crystal panel 19.

The backlight unit includes a plurality of LEDs 14, a metal core printed circuit board (MCPCB) 12 disposed under the plurality of the LEDs 14, a scattering plate 15 formed of polymethylmethacrylate (PMMA) to scatter the light generated from the LEDs 14, and a diffusing plate 16 for diffusing the light that has passed through the scattering plate 15. A variety of optical sheets 17 are disposed on the diffusing plate 16. A reflecting plate 13 is disposed between the LEDs 14 and the MCPCB 12 for reflecting light, which cannot transmit the diffusing plate 16 but is directed toward the MCPCB 12, toward the scattering plate 15.

The LEDs 14 are point light sources that emit red, green and blue lights. The MCPCB 12 is provided with a circuit for controlling the LEDs 14, and has relatively high heat dissipation property as compared with a conventional PCB. The MCPCB 12 functions to support the LEDs 14 as well as to control the light emission of the LEDs 14 using the circuit formed thereon.

A scattering optical pattern (not shown) is formed on a rear surface of the scattering plate 15. As shown in FIG. 2, the side emitting type LED 14 is designed to emit the light in a side direction rather than a vertical direction. However, in order to prevent the bright dot with respect to the light emitted in the vertical direction, the scattering plate 15 is provided to scatter the light as much as possible, thereby improving the brightness uniformity.

The diffusing plate 16 is spaced apart from the LEDs 14 at a predetermined distance so as to allow the light from the scattering plate 15 to have a more uniform distribution.

The reflecting plate 13 reflects the light that is reflected from the scattering plate 15 and/or the diffusing plate 16 and directed thereto or the light directly from the LEDs 14, thereby reducing the light loss.

In the above-described LCD 1, the light generated from the LEDs 14 is consecutively advanced to the scattering plate 15 and the diffusing plate 16, thereby providing the light having a uniform brightness to the liquid crystal panel 19.

As described above, the scattering plate 15 is formed of the PMMA to uniformly scatter the light generated from the LEDs 14. The PMMA is not transparent.

However, since the scattering plate formed of the PMMA has properties of a high coefficient of linear expansion and a low heat deformation temperature, it may be easily deformed under a high temperature/humidity environment.

The deformation of the scattering plate deteriorates the reliability of the backlight unit and thus the LCD.

Furthermore, the scattering plate formed of the PMMA cannot completely scatter the light generated in a vertical direction of the LEDs, thereby causing the poor bright spot.

SUMMARY OF THE INVENTION

Accordingly, the present invention is directed to a backlight unit/device and an LCD with the backlight unit, which substantially obviate one or more problems due to limitations and disadvantages of the related art.

An object of the present invention is to provide a backlight unit that has a scattering plate formed of tempered glass, thereby improving light transmission and reliability of an LCD even under high temperature/humidity environments.

Another object of the present invention is to provide a backlight unit in which a scattering plate is omitted, thereby reducing the manufacturing costs and thickness of an LCD.

Another object of the present invention is to provide an LCD having one of such backlight units.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a backlight unit comprising a plurality of light emitting diodes (LEDs) for generating light, a printed circuit board (PCB) for controlling the LEDs, a transparent scattering plate provided with a scattering optical pattern for scattering the light from the LEDs, and a diffusing plate for diffusing the light scattered by the scattering plate.

In another aspect of the present invention, there is provided a liquid crystal display device comprising a liquid crystal panel having upper and lower substrates between which a liquid crystal layer is formed, a plurality of light emitting diodes (LEDs) for generating light, a printed circuit board (PCB) for controlling the LEDs, a transparent scattering plate provided with a scattering optical pattern for scattering the light from the LEDs, and a diffusing plate for diffusing the light scattered by the scattering plate ad directing the diffused light towards the liquid crystal panel.

In still yet another aspect of the present invention, there is provided a backlight unit comprising a plurality of light emitting diodes (LEDs) for generating light, a printed circuit board (PCB) for controlling the LEDs, and a diffusing plate having a diverter for scattering the light generated from the LEDs.

In still another aspect of the present invention, there is provided a liquid crystal display device comprising a liquid crystal panel having upper and lower substrates between which a liquid crystal layer is formed, a plurality of light emitting diodes (LEDs) for generating light, a printed circuit board (PCB) for controlling the LEDs, and a diffusing plate having a diverter for scattering the light generated from the LEDs, wherein the diffusing plate diffuses the scattered light and directs the diffused light towards the liquid crystal panel.

In still yet another aspect of the present invention, there is provided a backlight device for a display panel, the device comprising a plurality of light emitting diodes (LEDs) configured to generate light, a scattering plate made of glass and disposed above the LEDs, the scattering plate having a scattering pattern thereon to scatter the light from the LEDs, and a diffusing plate disposed above the scattering plate with a gap between the diffusing plate and the scattering plate and configured to diffuse the scattered light and to direct the diffused light towards the display panel.

In still yet another aspect of the present invention, there is provided a backlight device for a display panel, the device comprising a plurality of light emitting diodes (LEDs) configured to generate light, and a diffusing plate disposed above the LEDs, and including a structure for scattering the light from the LEDs, wherein the scattering structure is attached on a surface of a portion of the diffusing plate, and the diffusing plate diffuses the scattered light and directs the diffused light towards the display panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

First Embodiment

Figure 1:
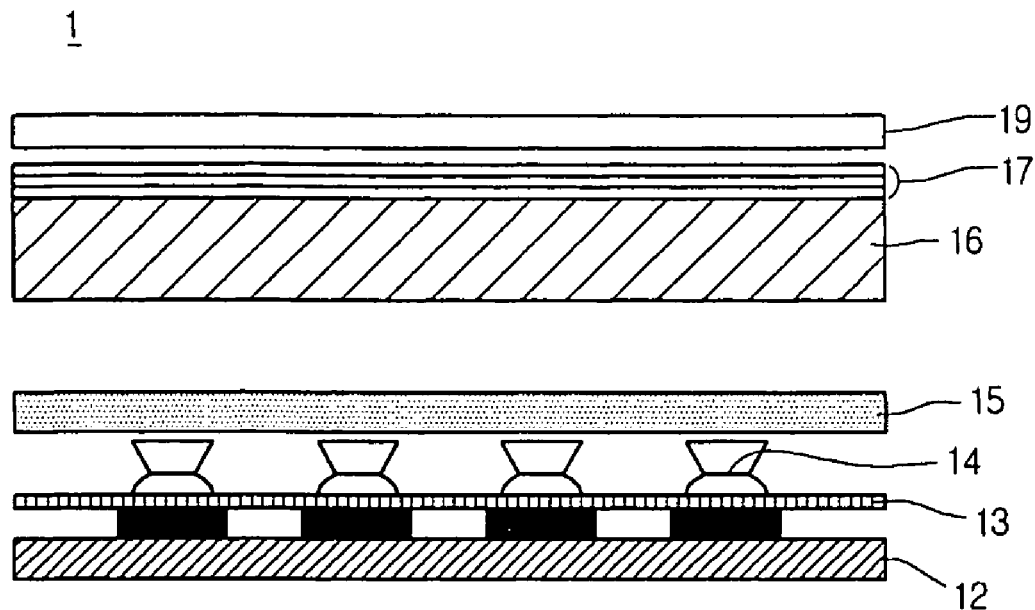
FIG. 1 is a sectional view of a related art LCD with an LED backlight unit.
Figure 2:
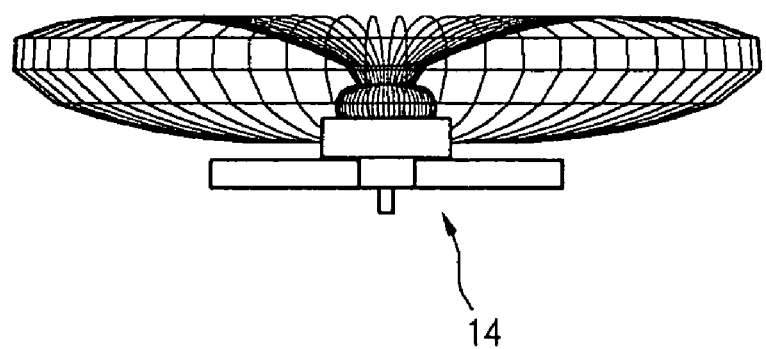
FIG. 2 is a view illustrating a light emission from a related art side emitter type LED.
Figure 3:
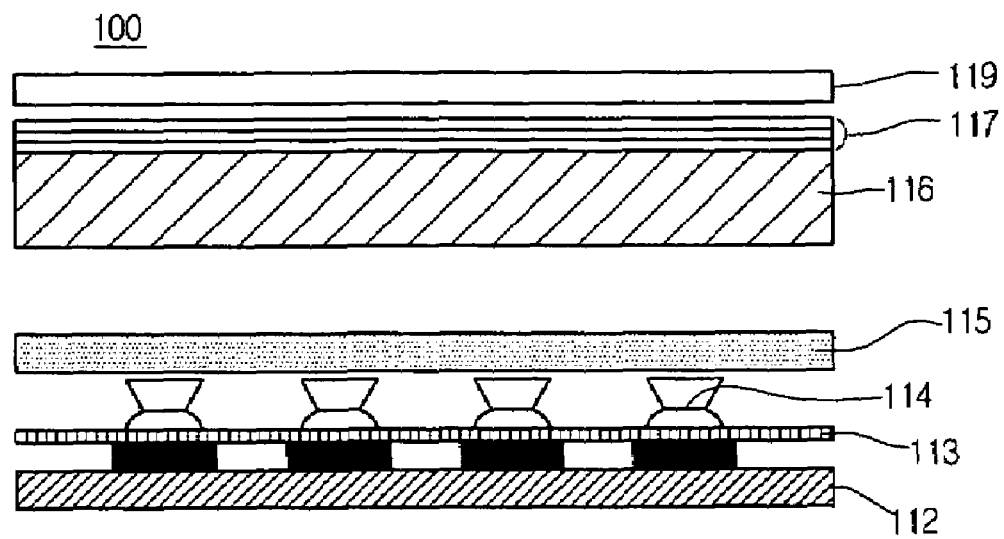
FIG. 3 is a sectional view of an LED with an LED backlight unit according to a first embodiment of the present invention.

FIG. 3 shows an LCD with a backlight unit according to a first embodiment of the present invention.

Referring to FIG. 3, an LCD 100 of this embodiment includes a liquid crystal panel 119 having an upper substrate on which red, green and blue color filter layers and a black matrix are formed and a lower substrate on which pixel electrodes and thin film transistors (TFTs) are formed, and a backlight unit for supplying light to the liquid crystal panel 119. A liquid crystal layer is formed between the upper and lower substrates of the liquid crystal panel 119.

The backlight unit includes a transparent scattering plate 115 formed of tempered glass to scatter the light generated from a plurality of LEDs 114, and a diffusing plate 116 for diffusing the light that has passed through the scattering plate 115. A variety of optical sheets 117 are disposed on the diffusing plate 116. A reflecting plate 113 is disposed between the LEDs 114 and a MCPCB 112 for reflecting light, which is directed toward the MCPCB 112, toward the scattering plate 115.

The LEDs 114 are point light sources that emit red, green and blue lights, and can be the side emitting type or other types.

The MCPCB 112 includes one or more circuits for controlling the LEDs 114. An electrode unit may be formed on the circuit(s) of the MCPCB 112 to transmit control signals to the LEDs 114 and support the LEDs 114. Therefore, the MCPCB 112 controls the light emission of the LEDs 114 using the circuit(s) and the electrode unit(s).

A scattering optical pattern (not shown) is formed on a rear surface of the scattering plate 115 formed of the tempered glass to scatter the light generated in a vertical direction of the side emitting type LEDs 114. The scattering optical pattern can be formed by dotting a surface scattering material on the transparent scattering plate 115 and can correspond to the locations of the LEDs 114.

Figure 4:
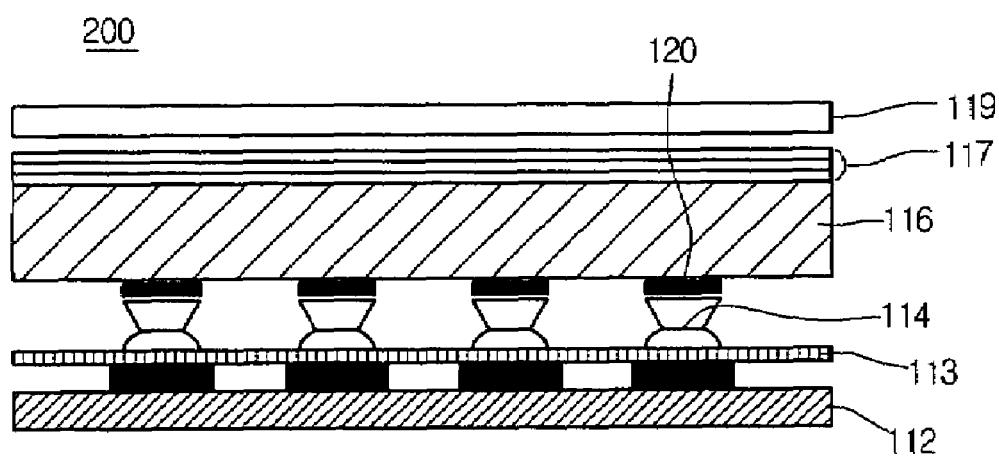
FIG. 4 is a sectional view of an LED with an LED backlight unit according to a second embodiment of the present invention.

Alternatively, as shown in FIG. 4, a diverter (120) having a plate formed of PMMA, acryl, or glass, on which the scattering material is dotted, may be attached at the location of the scattering optical pattern on the scattering plate 115 to scatter the light emitted in the vertical direction from the LEDs 114. That is, the diverter attached to the scattering plate 115 can function as a scatter pattern/means to scatter the light.

As a result, formulation of poor bright dots on the liquid crystal panel by the light generated in the vertical direction of the side emit type LEDs 114 can be effectively prevented in the first embodiment.

That is, when the light emitted in the vertical direction is scattered by the transparent scattering plate 115, formation of poor bright dot can be prevented, thereby providing a uniform brightness.

Furthermore, since the transparent scattering plate 115 formed of the tempered glass has properties of a low coefficient of linear expansion and a high heat deformation temperature, the scattering plate 115 is not easily deformed even in high temperature/humidity environments.

The diffusing plate 116 is spaced apart from the LEDs 114 at a predetermined distance so as to allow the light from the scattering plate 115 to have the uniform distribution.

The reflecting plate 113 reflects the light that is reflected from the scattering plate 115 and/or the diffusing plate 116 and directed thereto or the light directly from the LEDs 114, thereby reducing the light loss.

The reflecting plate 113 is formed by attaching a reflecting sheet formed in the form of an adhering sheet on the MCPCB 112. At this point, the reflecting sheet is coated with acryl or polyester solution.

In the above-described LCD 100, the light generated from the LEDs 114 are consecutively advanced to the scattering plate 115 and the diffusing plate 116. The light directed to the MCPCB 112 without being transmitted through the scattering plate 115 and the diffusing plate 116 is reflected toward the scattering plate 115 and the diffusing plate 116 by the reflecting plate 113.

As described above, according to the first embodiment of the present invention, by changing the material of the scattering plate from the PMMA to the tempered glass, the transmission rate and the reliability of the LCD can be improved.

Second Embodiment

FIG. 4 shows an LCD with a backlight unit according to a second embodiment of the present invention.

Since an LCD of this embodiment is similar to that of the first embodiment, only the different parts will be described hereinafter.

Referring to FIG. 4, a backlight unit for supplying light to a liquid crystal panel 119 includes a diffusing plate 116 for diffusing the light emitted from a plurality of LEDs 114, a diverter 120 disposed on a rear surface of the diffusing plate 116 to scatter the light emitted in the vertical direction, an optical sheet 117 disposed between the liquid crystal panel 119 and the diffusing plate 116, and a reflecting plate 113 disposed between the LEDs 114 and the MCPCB 112 for reflecting the light, which is directed toward the MCPCB 112, toward the liquid crystal panel 119.

The LEDs 114 are point light sources that emit red, green and blue lights, and can be side emitting type or other types.

The diverter 120 having one or more smaller plates formed of PMMA, acryl (e.g., transparent acryl), or glass (e.g., transparent tempered glass), on which the scattering material is dotted, is attached on a rear surface of the diffusing plate 116. There, the diverter 120 can be selectively located on only certain portions of the rear surface of the diffusing plate 116 to correspond with the locations of the LEDs 114 as shown in FIG. 4, but can be provided in different patterns and/or manner as desired. When the diverter 120 is formed of the acryl or glass, the transmission rate can be enhanced.

In this second embodiment, since the scattering plate 115 used for scattering the light generated from the diffusing plate 116 is omitted and instead the diffusing plate 116 is designed to diffuse and scatter the light, the number of parts and thickness of the backlight unit can be reduced. Furthermore, the omission of the separate scattering plate enhances the brightness of the LCD.

In the first and second embodiments, the liquid crystal panel 119 includes the upper and lower substrates, a liquid crystal layer therebetween, and other conventional components of a liquid crystal panel such as pixel units, color filters, etc. Also, although the MCPCB 112 is used, other types of PCBs or circuit substrate may be used.

According to the first embodiment of the present invention, since the backlight unit has a transparent scattering plate formed of tempered glass, a light transmission rate and reliability of the LCD can be improved even in high temperature/humidity environments.

Furthermore, since the scattering plate may be omitted from the backlight unit and the diffusing plate is designed to perform the function of the scattering plate according to the second embodiment of the present invention, the manufacturing cost and thickness of the backlight unit can be reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display device comprising:
   a liquid crystal panel having upper and lower substrates between which a liquid crystal layer is formed;
   a plurality of light emitting diodes (LEDs) for generating light;
   a printed circuit board (PCB) for controlling the LEDs; and
   a diffusing plate for diffusing the light generated from the LEDs; and
   a plurality of diverters attached on a rear surface of the diffusing plate and having a glass plate on which a scattering material is doted, wherein the diverters respectively correspond to the LEDs.

2. The liquid crystal display device according to claim 1, further comprising:
   a reflecting plate for reflecting light directed toward the PCB.

3. The liquid crystal display device according to claim 1, wherein the diverters are formed on portions of the rear surface of the diffusing plate, and corresponds to the LEDs.

4. The liquid crystal display device according to claim 2, wherein the reflecting plate is formed of acryl or polyester.

5. The liquid crystal display device according to claim 1, wherein the diverters are designed to scatter light emitted in a vertical direction of the LEDs.

6. The liquid crystal display device according to claim 1, wherein the PCB is a metal core printed circuit board (MCPCB).

* * * * *